United States Patent
Nozawa et al.

(10) Patent No.: US 6,256,460 B1
(45) Date of Patent: Jul. 3, 2001

(54) DETECTING DEVICE AND PROCESSING DEVICE

(75) Inventors: Ryouei Nozawa; Akira Sugiyama, both of Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/537,561

(22) Filed: Mar. 30, 2000

(30) Foreign Application Priority Data

Mar. 30, 1999 (JP) .................................... 11-088709

(51) Int. Cl.⁷ .................................................. G03G 15/10
(52) U.S. Cl. .............................. 399/57; 399/237; 399/247
(58) Field of Search ..................................... 137/391, 392, 137/558; 340/592; 347/7, 19; 399/57, 58, 59, 61, 62, 63, 237, 238, 246, 247

(56) References Cited

U.S. PATENT DOCUMENTS

| | | | | |
|---|---|---|---|---|
| 3,580,158 | * | 5/1971 | Scholle et al. | 399/237 |
| 4,631,116 | * | 12/1986 | Ludwig | 204/1 |
| 4,813,240 | * | 3/1989 | Hon | 62/171 |
| 5,126,023 | * | 6/1992 | Huang et al. | 204/180 |
| 5,926,668 | * | 7/1999 | Lee | 399/57 |

* cited by examiner

Primary Examiner—Arthur T. Grimley
Assistant Examiner—Hoang Ngo
(74) Attorney, Agent, or Firm—Sughrue, Mion, Zinn, Macpeak & Seas, PLLC

(57) ABSTRACT

An automatic developing apparatus is provided with a developing tank, a reserve tank, a pump, a piping which connects the reserve tank and the pump and whose one end is disposed above the developing tank, a first electrode provided in the piping, a second electrode provided within the developing tank, and a sensor which is electrically connected to the first electrode and the second electrode.

14 Claims, 3 Drawing Sheets

DETECTING DEVICE AND PROCESSING DEVICE

BACKGROUND OF THE INVENTION

1. Field of the Invention

The present invention relates to a detecting device which detects whether solution is being supplied to a tank, and to a processing device which utilizes the detecting device.

2. Description of the Related Art

In processing tanks in an automatic developing apparatus such as a developing tank and a fixing tank, as photosensitive materials are subjected to processing, the processing solutions in the tanks deteriorate due to processing and deteriorate over time. To compensate therefor, replenishing solutions must be replenished in order to activate the processing solutions in the tanks. Further, the amount of processing solution within the processing tank decreases due to evaporation and due to the processing solution being carried out from the tank on the photosensitive material. In these cases as well, replenishing solution is replenished so as to prevent the surface level of the processing solution within the processing tank from falling.

Usually, a flow path is formed by piping extending from a reserve tank, in which replenishing solution is stored, to the processing tank. The replenishing solution is discharged to above the processing tank by the driving of a pump.

In such an automatic developing apparatus, if the amount of the replenishing solution with the reserve tank is not monitored, there may not be any replenishing solution when replenishing is necessary, which may lead to problems with the operation of the automatic developing apparatus. The following methods are known as methods of monitoring the existence of the replenishing solution in the reserve tank.

A method in which a sealed reserve tank is used is known, and the existence of the replenishing solution is detected on the basis of the load applied to the pump which discharges the replenishing solution from the tank.

However, this method cannot use an open-type reserve tank.

A method in which the surface level of the solution in the tank is monitored by a level sensor mounted at the tank is used, so that the existence of the replenishing solution is detected.

In this method, it can be determined whether or not there is replenishing solution in the tank, but it cannot be determined whether replenishing solution is actually being supplied to the processing tank.

A method is known in which a rotary blade or the like, which rotates due to the flow of the replenishing solution, is provided in the piping for supplying the replenishing solution. By monitoring the rotational state of the rotary blade, the existence of the replenishing solution is detected.

In this method, if a state in which replenishing solution is not replenished continues over a long period of time, problems in operation may arise due to solidification of chemical agents contained in the replenishing solution.

SUMMARY OF THE INVENTION

In view of the aforementioned, an object of the present invention is to provide a detecting device which can be applied to an automatic processing apparatus having an open-type reserve tank and which detects whether a processing solution is being supplied to the processing tank and which does not cause trouble even if a state in which replenishing solution is not replenished continues over a long period of time, and to provide a processing apparatus using the same.

The present invention provides a detecting device for use in a processing device having a tank storing a liquid and a supplying means for supplying liquid from above the tank along a supply path, the detecting device being for detecting whether liquid is being supplied to the tank, the detecting device comprising: a first electrode disposed on the supply path of the liquid; a second electrode disposed in the tank; and a sensor electrically connected to the first electrode and the second electrode, the sensor detecting whether a closed circuit exists between the first electrode and the second electrode.

The present invention also provides a processing device comprising: a tank for storing a liquid; supplying means for supplying liquid from above the tank along a supply path; a first electrode disposed on the supply path of the liquid; a second electrode disposed in the tank; and a sensor which is electrically connected to the first electrode and the second electrode, the sensor detecting whether a closed circuit exists between the first electrode and the second electrode.

In accordance with the present invention, when the supplying means is not supplying a liquid, or when the amount of supplied liquid is too small for the liquid to flow continuously, a layer of air exists between the first and second electrodes. Thus, the circuit between the first electrode and the second electrode is open. On the other hand, when the amount of supplied liquid is so large that a continuous flow of the supplied liquid is formed, the circuit is closed, and the sensor detects that the liquid is being supplied. The detecting device does not include any movable portions such as a rotary blade whose operation may become problematic if liquid is not supplied for a long period of time and the viscosity of the liquid adhered to the detecting device thereby increases. Thus, the detecting device can be used continuously with hardly any need for maintenance at all. Further, even if the surface of the liquid is not detected at all times (as is the case when a level sensor is used), if the sensor does not detect that the circuit is closed when the supplying means is operated, the operator can know that the liquid is not being supplied.

DESCRIPTION OF THE PREFERRED EMBODIMENTS

Figure 1:
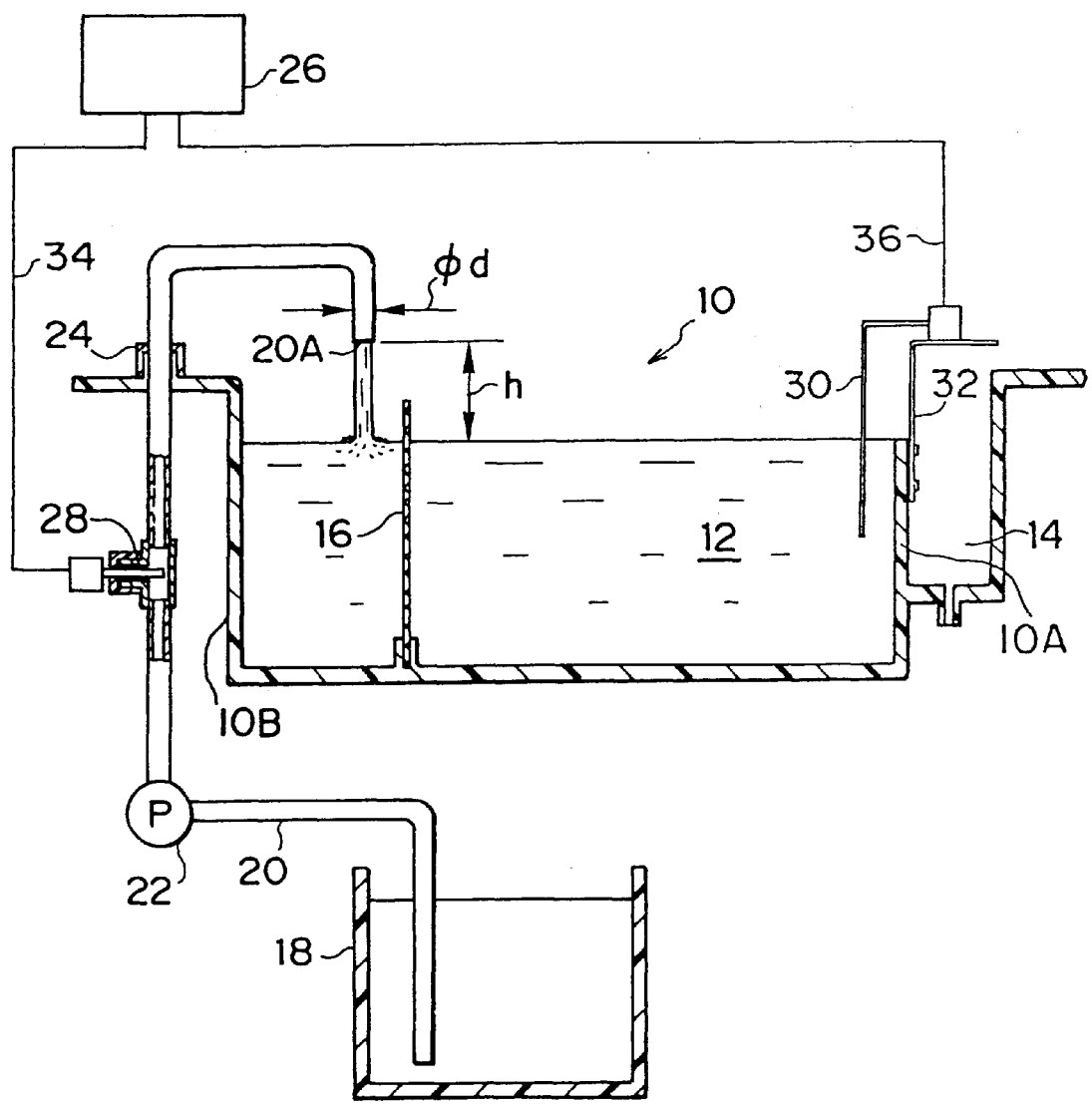
FIG. 1 is a side view of a developing tank used in an embodiment of the present invention.

FIG. 1 illustrates a developing tank 10 of an automatic developing apparatus relating to an embodiment of the present invention.

Developer 12 is stored in the developing tank 10. By immersing a photosensitive material (not shown) in the developer 12, developing processing is carried out.

A processing rack (not illustrated), to which rollers or guide plates are mounted which guide and convey the photosensitive material in the developer in the developing tank 10, is provided in a case in which a plurality of photosensitive materials or an elongated photosensitive material wound in roll form are processed continuously. By providing the processing rack in the developing tank 10, the photosensitive material is guided and conveyed in the processing tank 10 along a substantially U-shaped conveying path from the rear toward the front of the surface of the drawing of FIG. 1, such that the photosensitive material is conveyed to the next process while being subjected to developing processing.

As shown in FIG. 1, a side wall 10A of the developing tank 10 is lower than a side wall 10B which opposes the side wall 10A. The water which exceeds the height of the side wall 10A overflows such that the surface level of the developer in the developing tank 10 is maintained. The developer 12 which has passed over the side wall 10A flows down into an overflow tank 14 provided at the outer side of the side wall 10A.

The developing tank 10 is partitioned by a filter membrane 16. Developing replenishing solution is replenished to the region to the left side in FIG. 1 of the filter membrane 16. A discharge opening 20A of a piping 20, which sucks and supplies developing replenishing solution from a reserve tank 18 which houses the developing replenishing solution, is disposed above this left side region so as to be directed downward.

Developing replenishing solution, whose concentration has been adjusted in advance to a predetermined concentration, is stored in the reserve tank 18. One end of the piping 20 opens in the developing replenishing solution in a vicinity of the bottom portion of the reserve tank 18. A bellows-type pump 22 is provided along the piping 20. By one stroke of the pump 22, a predetermined amount (a unit driving amount V) of developing replenishing solution is sucked out from the reserve tank 18.

The other end portion of the piping 20 is held by a bracket 24 in a vicinity of the developing tank 10, and bends in a substantial U-shape above the liquid surface of the developer in the developing tank 10. The discharge opening 20A is disposed so as to oppose the surface of the developer in the developing tank 10.

The inner diameter of the discharge opening 20A of the piping 20 is d. The height from the discharge opening 20A to the surface of the developer 12 in the developing tank 10 is h.

A first electrode 28 is disposed along the piping 20 at the downstream side of the pump 22. The first electrode 28 is positioned in the flow path of the developing replenishing solution within the piping 20. When the developing replenishing solution flows due to the driving of the pump 22, the first electrode 28 contacts the developing replenishing solution within the piping 20. When the pump is stopped, it is unclear as to whether the first electrode 28 contacts or does not contact the developing replenishing solution. The reason why it is unclear is that, when the pump 22 is not being driven, there are cases in which developing replenishing solution within the piping 20 remains therein and there are cases in which the developing replenishing solution within the piping 20 returns to the reserve tank 18.

A second electrode 30 is mounted via a bracket 32 at a vicinity of the side wall 10A of the developing tank 10. A portion of the second electrode 30 is immersed in the developer 12.

The first electrode 28 and the second electrode 30 are connected to the input end of the sensor 26 via signal wires 34, 36, respectively.

The sensor 26 creates a predetermined potential difference between the first electrode 28 and the second electrode 30. Therefore, a voltage difference arises between a case in which a circuit between the first electrode 28 and the second electrode 30 is closed and a case in which the circuit is open. The first electrode 28, the second electrode 30, and the sensor 26 form a detecting device for detecting the existence of replenishing solution.

When the pump 22 is not activated and no column of replenishing solution is formed between the discharge opening 20A and the solution surface in the developing tank 10, the circuit is open. When the pump 22 is activated and the developing replenishing solution begins to flow into the piping 20 and is discharged from the discharge opening 20A and flows down into the developing tank 10, the circuit is closed.

The unit driving amount V, the inner diameter d of the discharge opening 20A, and the distance h from the discharge opening 20A to the solution surface of the developer 12 in the developing tank 10 are set such that the relation of following formula (1) is established. In the present embodiment, the unit driving amount V and the inner diameter d are fixed values which cannot be varied. Therefore, by adjusting the distance h, formula (1) can be established. The distance h can be adjusted by mounting to the discharge opening 20A an adapter or the like whose lengthwise dimension is known such that the open end of the mounted adapter is the new discharge opening.

$$V \geq \pi \times (d/2)^2 \times h \times p \tag{1}$$

wherein p is a stability factor, and $0.3 \leq p \leq 0.7$.

This principle was derived from the concept that, if the column of the developing replenishing solution is formed in the space from the discharge opening 20A to the solution surface of the developer 12 in the developing tank 10, the circuit can be closed. The stability factor p is obtained experimentally, and expresses a range in which the supply of developing processing solution can be reliably detected even if the column of developing replenishing solution discharged from the discharge opening 20A is more narrow than the inner diameter of the discharge opening 20A.

Next, operation of the present embodiment will be described.

As the developing processing of the photosensitive material in the developing tank 10 proceeds, the developer 12 deteriorates in accordance with the processed amount (processed surface area) of photosensitive materials, or due to the contact of the developer 12 with air. Further, when a photosensitive material exits from the developing tank 10 and reaches the subsequent step, the photosensitive material carries out a portion of the developer 12, and therefore, the amount of developer 12 within the developing tank 10 decreases. Moreover, the amount of developer 12 decreases due to evaporation as well.

If the developing capability of the developer 12 deteriorates due to causes such as those mentioned above, the developing capability can be restored by replenishing developing replenishing solution.

The developing replenishing solution is stored in advance in the reserve tank 18. By driving the pump 22 as needed, the developing replenishing solution in the reserve tank 18 is fed into the developing tank 10.

Conventionally, a rotary blade was disposed within the piping 20 as a sensor for judging whether the developing replenishing solution was reliably being fed in. By observing the rotation of the rotary blade, the state of flow of the developing replenishing solution could be detected. As compared with a sensor which merely detected the level of the developing replenishing solution in the reserve tank 18, a detecting device using the rotary blade functioned better because the state of flow of the developing replenishing solution could actually be observed. However, in the device, if the developing replenishing solution was not replenished over a long period of time, the developing replenishing solution adhering to the rotary blade evaporated, and the chemical agents contained in the developing replenishing solution hardened and precipitated. Thus, problems with operation occurred frequently.

In the present embodiment, only the excellent effects of the device with the level sensor and the device with the rotary blade are utilized, such that detection can be effected reliably and precisely regardless of the length of time the flow of the developing replenishing solution is stopped.

Namely, when it is time for the developing replenishing solution to be replenished, the driving of the pump 22 begins, and the developing replenishing solution is sucked up from the reserve tank 18.

The developing replenishing solution flows, via the piping 20, down into the developing tank 10 from the discharge opening 20A.

Figure 2:
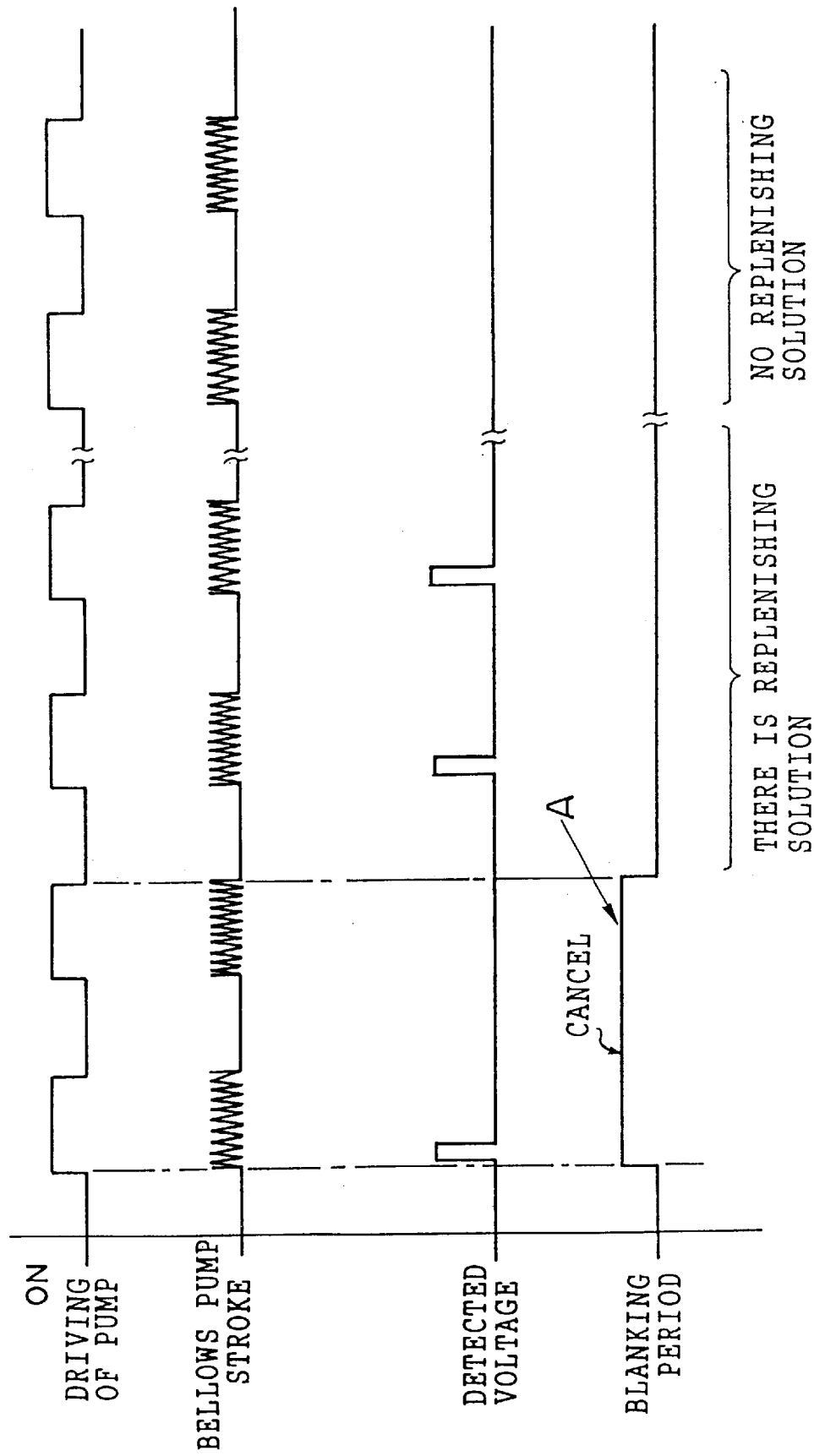
FIG. 2 is a time chart of driving of a pump and voltage for detecting the existence of replenishing solution.

Because the first electrode 28 is provided in the piping 20, the first electrode 28 reliably contacts the developing replenishing solution. The second electrode 30 is immersed in the developer 12 in the developing tank 10. When the replenishing solution is not being replenished, the developer 12 in the developing tank 10 and the replenishing solution in the piping 20 are not continuous. Therefore, the circuit between the electrodes 28, 30 is open. However, when the developing replenishing solution flowing down from the discharge opening 20A to the surface of the solution in the developing tank 10 is continuous, the circuit is closed. In this way, the sensor 26 can detect that there is developing replenishing solution in the reserve tank 18 and that the developing replenishing solution is being supplied to the developing tank 10 (see FIG. 2).

The following formula (1) must be established in order to close the circuit.

$$V \geq \pi \times (d/2)^2 \times h \times p \qquad (1)$$

wherein p is a stability factor, and $0.3 \leq p \leq 0.7$.

In this way, while the pump is being operated, the column of developing replenishing solution exists between the discharge opening 20A and the solution surface of the developing tank 10. Therefore, the circuit is closed. The sensor 26 detects that the circuit is closed, and thereby detects that there is the developing replenishing solution in the reserve tank 18 and that the developing replenishing solution is being supplied to the developing tank 10.

In above formula (1), in the present embodiment, the unit driving amount V and the opening diameter d of the discharge opening 20A are fixed values, and formula (1) is established by adjusting the distance h. However, if the unit driving amount V and the opening diameter d of the discharge opening 20A can be adjusted, it suffices to adjust any of these three variables.

In the above-described embodiment, a case in which the developing replenishing solution remains in the piping when the pump 22 is not driven is described. However, in a case in which the developing replenishing solution within the piping 20 is returned to the reserve tank 18 such that there is no developer within the piping 20 when the operation of the pump 22 is stopped, even if the driving of the pump is started, for a predetermined time there is a transitional period in which the sensor 26 judges that the first electrode 28 does not contact the developing replenishing solution and the circuit is open, i.e., judges that there is no developing replenishing solution in the reserve tank 18.

In order to solve this problem, the number of times the pump 22 strokes until the developing replenishing solution in the reserve tank 18 reaches the solution surface of the developing tank 10 is determined, and this number of times is set to n. A blanking period (a period of time in which no judgement is made) in which observation is not carried out is provided from the start of the driving of the pump 22 until the number of strokes reaches the predetermined number n (see FIG. 2). In this way, erroneous judgement during the transitional period at the start of the driving of the pump 22 can be prevented.

The automatic developing apparatus of the present embodiment utilizes the ease of utility of a level sensor having a pair of electrodes (the first electrode 28 and the second electrode 30) which is not a movable member, and can detect that there is the developing replenishing solution in the reserve tank 18 and that the developing replenishing solution is being supplied to the developing tank 10, by disposing one electrode (the first electrode 28) in the flow path of the developing replenishing solution in the piping 20, and the other electrode (the second electrode 30) within the developer 12 in the developing tank 10, and by establishing the formula (1) which is the condition in which the developing replenishing solution is supplied from the discharge opening 20A to the developing tank 10 in the form of a continuous flow (not in droplets).

Figure 3:
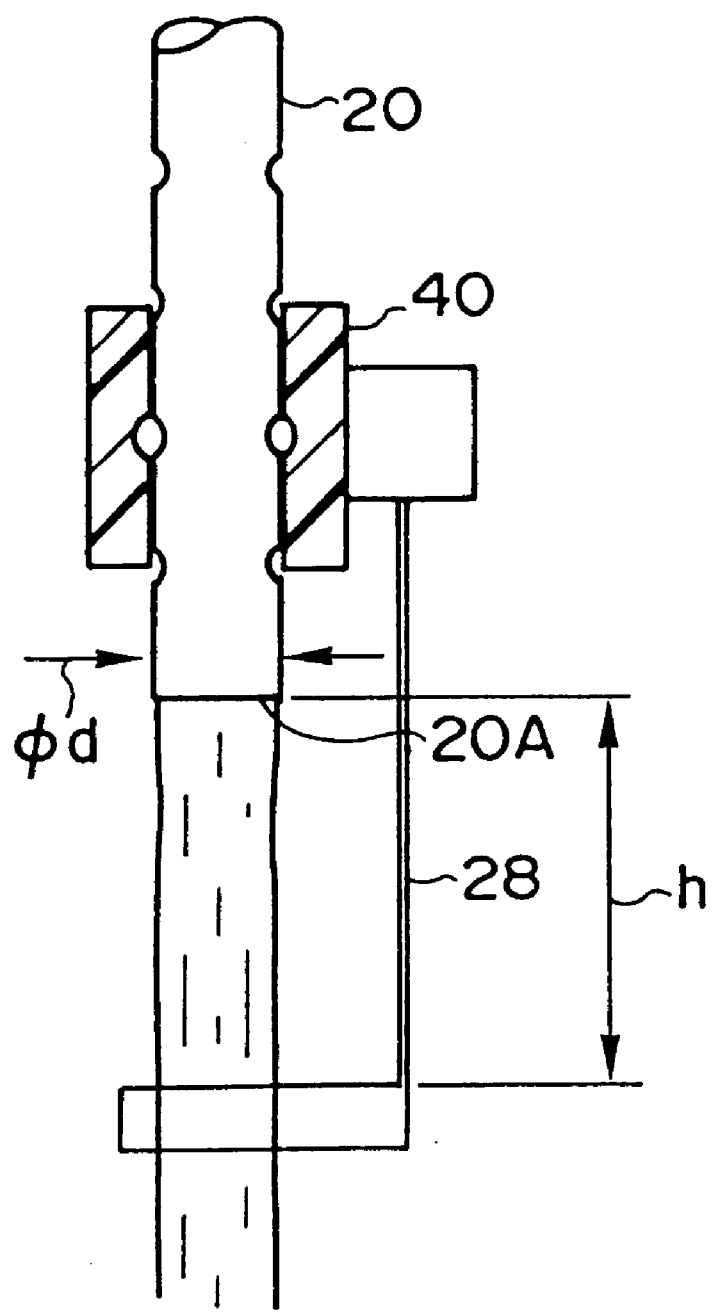
FIG. 3 is an expanded view of a vicinity of a discharge opening of a piping used in a modified example.

In the present embodiment, the first electrode 28 is disposed in the piping 20. However, as illustrated in FIG. 3, a base portion of the first electrode 28 may be fixed to the piping 20 in a vicinity of the discharge opening 20A via a bracket 40, such that the electrode portion is suspended and disposed on the flow path of the developing replenishing solution flowing down from the discharge opening 20A. In this case, the distance from the discharge opening 20A to the first electrode is h, and the distance h can be adjusted merely by changing the position of the bracket 40.

In the above-described embodiment, the supplying means is provided with the pump. However, solution may be supplied by using a supplying means having a reserve tank at whose bottom portion an opening is formed and which is disposed above the developing tank, a piping disposed from the opening of the reserve tank to above the surface of the solution in the developing tank 10, and a valve provided at the piping, and opening the valve periodically for a fixed period of time.

What is claimed is:

1. A detecting device for use in a processing device having a tank storing a liquid and a supplying means for supplying liquid to said tank from above the tank along a supply path, said detecting device being for detecting whether liquid is being supplied to the tank, said detecting device comprising:
   a first electrode disposed on the supply path of the liquid;
   a second electrode disposed in the tank; and
   a sensor electrically connected to said first electrode and said second electrode, said sensor detecting whether a closed circuit exists between said first electrode and said second electrode.

2. A processing device comprising:
   a tank for storing a liquid;
   supplying means for supplying liquid from above said tank along a supply path;
   a first electrode disposed on the supply path of the liquid;
   a second electrode disposed in said tank; and
   a sensor which is electrically connected to said first electrode and said second electrode, said sensor detecting whether a closed circuit exists between said first electrode and said second electrode.

3. A processing device according to claim 2, wherein said supplying means periodically supplies a fixed amount of liquid.

4. A processing device according to claim 3, wherein said supplying means comprises piping.

5. A processing device comprising:

a tank for storing a liquid;

supplying means for supplying liquid form above said tank along a supply path;

a first electrode disposed on the supply path of the liquid;

a second electrode disposed in said tank; and a sensor which is electrically connected to said first electrode and said second electrode, said sensor detecting whether a closed circuit exists between said first electrode and said second electrode, wherein said supplying means periodically supplies a fixed amount of liquid, said supplying means comprises piping, and the piping has a discharge opening with a diameter of d mm, disposed a distance h mm from a surface of liquid in said tank, with liquid supplied in a fixed amount V ml, and a stability factor is p wherein 0.3<p<0.7, a formula (1) as follows is satisfied $$V \geq \pi \times (d/2)^2 \times h \times p \qquad (1).$$

6. A processing device according to claim 3, wherein said sensor detects whether a closed circuit exists, after a predetermined period of time has elapsed from when said supplying means initiated a periodic liquid supply.

7. A processing device according to claim 3, wherein said supplying means includes a pump.

8. A processing device according to claim 2, wherein said processing device is an automatic developing apparatus.

9. A processing device according to claim 2, wherein said supplying means includes an open tank devoid of cover.

10. A processing device according to claim 9, the tank includes a side wall having at least two portions, with one portion of the side wall of said tank being lower than another portion of the side wall.

11. A processing device according to claim 10, further comprising a recovery tank, which recovers liquid which has overflowed from said tank, provided at an outer side of one of the portions of the side wall of said tank.

12. A processing device according to claim 11, wherein said tank includes a partitioning plate disposed vertically in said tank and forming a partition therein, said partitioning plate being taller than one portion of the side wall of said tank, and shorter than the other portion of the side wall of said tank.

13. A processing device according to claim 12, wherein said tank includes opposite sides including a first side being continuous with one of said one portion and said another portion of said side wall, and a second side opposite another of said one portion and said another portion of said side wall, and said supplying means supplies liquid to a space defined at said second side.

14. A processing device according to claim 12, wherein said second electrode is disposed in a space continuous with one of the portions of the side wall.

* * * * *